(12) United States Patent
Jacoby (10) Patent No.: US 7,383,229 B2
(45) Date of Patent: Jun. 3, 2008

(54) ACCESS CONTROL AND METERING SYSTEM FOR STREAMING MEDIA

(75) Inventor: Ronald Jacoby, Saratoga, CA (US)

(73) Assignee: Yahoo! Inc., Sunnyvale, CA (US)

(*) Notice: Subject to any disclaimer, the term of this patent is extended or adjusted under 35 U.S.C. 154(b) by 152 days.

(21) Appl. No.: 10/680,507

(22) Filed: Oct. 6, 2003

(65) Prior Publication Data

US 2004/0254887 A1 Dec. 16, 2004

Related U.S. Application Data

(60) Provisional application No. 60/454,231, filed on Mar. 12, 2003.

(51) Int. Cl.
*G06Q 10/00* (2006.01)
*H04K 1/00* (2006.01)
*H04L 9/00* (2006.01)
*G06F 11/30* (2006.01)

(52) U.S. Cl. ............... 705/52; 701/1; 705/51; 705/53; 713/171; 713/193

(58) Field of Classification Search .......... 705/52, 705/1, 51, 53; 713/171, 193
See application file for complete search history.

(56) References Cited

U.S. PATENT DOCUMENTS

| | | | | |
|---|---|---|---|---|
| 5,825,883 A * | 10/1998 | Archibald et al. | ............ | 705/53 |
| 5,887,243 A * | 3/1999 | Harvey et al. | ............... | 725/136 |
| 7,222,105 B1* | 5/2007 | Romansky | ................... | 705/57 |
| 2002/0107701 A1* | 8/2002 | Batty et al. | ..................... | 705/1 |
| 2003/0097564 A1* | 5/2003 | Tewari et al. | ............... | 713/171 |
| 2003/0158816 A1* | 8/2003 | Rouse | ........................ | 705/51 |
| 2004/0107356 A1* | 6/2004 | Shamoon et al. | ........... | 713/193 |
| 2004/0139469 A1* | 7/2004 | Incentis | ....................... | 725/91 |
| 2005/0054285 A1* | 3/2005 | Mears et al. | ............... | 455/2.01 |

* cited by examiner

*Primary Examiner*—Andrew J. Fischer
*Assistant Examiner*—Charlie C. L. Agwumezie
(74) *Attorney, Agent, or Firm*—Darby & Darby PC; Thomas R. Marquis (57) ABSTRACT

The present invention provides systems and techniques for transmitting a streaming media file. One of the techniques includes sending a metering uniform resource locator (URL) from a first server to a client player over a network, and sending a streaming media file from a second server to the client player over the network. The streaming media file includes at least one embedded metering event. In response to receiving the metering URL and the embedded metering event at the client player, a user meter is ticked.

28 Claims, 6 Drawing Sheets

ACCESS CONTROL AND METERING SYSTEM FOR STREAMING MEDIA

CROSS-REFERENCE TO RELATED APPLICATION

This application claims priority to U.S. Provisional Patent Application No. 60/454,231, filed Mar. 12, 2003, of Ronald Jacoby, titled Access Control and Metering System for Streaming Media, and is incorporated by reference herein in its entirety for all purposes.

BACKGROUND OF THE INVENTION

This invention relates generally to providing streaming media, and more specifically to providing a streaming media access system and a streaming media metering system based on metering information in a media stream.

Streaming media might comprise streaming audio, streaming video, a combination of the two, or similar data. Generally, streaming media is characterized by data that is transmitted or moved from a source to a destination where the destination can begin to use the data before the transmission or movement is complete, often without requiring an indication of an end to the data. As an example, an audiovisual presentation might be streamed over the Internet using data packets, wherein the recipient can start a presentation of the audiovisual presentation while data packets for later portions of the presentation are yet to be received.

Streaming media can be of indeterminate length, with no predetermined ending, such as might be the case for an Internet radio station streaming their broadcast, but streaming media might also have a finite length. While the term "streaming media" as used herein applies to indeterminate or predetermined length media unless otherwise indicated, for ease of understanding many examples refer to a "streaming media file", which is most commonly media having a well-defined beginning and end. Thus, it should be understood that streaming media need not always have a well-defined beginning and end, but it is often characterized by such concepts.

A streaming media file might be transmitted in a continuous stream in a compressed form over the Internet and played by a media player running on a user device, such as a personal computer (PC) or other device, as the continuous streaming media file arrives. To play a streaming media file as it arrives, the file is uncompressed in real time, and the video and audio data are played on the media player, which directs video data to the display and audio data to speakers. A media player may be either an integral part of a browser or transmitted over the Internet to the user just prior to consumption of the streaming media file. Examples of known streaming media players include Microsoft Corporation's Windows Media Player™, RealNetwork Incorporated's RealOne Player™, RealPlayer™, or RealJukebox™, or Apple Computer Incorporated's QuickTime Player™. Streaming media players use a standard and/or proprietary algorithms for video and audio compression. Programs that compress streaming media files prior to the files being sent to a user and decompress the received files are typically referred to as codec programs.

Streaming media files are typically sent from prerecorded digitized media files, but may be distributed as part of a digitized live broadcast feed. In a live broadcast using an analog capture system, video and/or audio signals are converted from an analog format to a compressed digital signal in real time and transmitted from a server. Various protocols can be used for serving media files over the Internet or other network where such media might be transmitted and consumed. For example, the HTTP protocol usable over the Internet between HTTP servers and HTTP clients might be used. In a common implementation, an HTTP server serves up HTML pages and media that is linked to by the HTML pages. As HTML pages with their links to other HTML pages are considered to form a "web", such as the "World Wide Web", HTTP servers are often thought of as "Web" servers. Although such a server might serve more than just HTML, they are referred to herein as "web" servers, according to common usage. In common usage, an HTTP client, i.e., a program or device that receives and "consumes" HTML and media, is often referred to as a "browser". Web servers used to stream streaming media files include Yahoo!'s web servers, such as Yahoo! Movies™, Yahoo! Music™, and Yahoo! News™, among others.

Streaming media, especially video, requires a large bandwidth channel to be effective, as the recipient often expects to begin a presentation shortly after the stream starts to be received and expects to consume the presentation continuously once it starts. Therefore, the bandwidth of the channel over which the streaming media is received typically needs to be on the order of the consumption rate of the media. For example, if a person desires to view a presentation that consumes 1 megabit/second, the person would probably need a channel that delivers on the order of 1 megabit/second to view the presentation as it is streamed. Attempts have been made to stream video over low bandwidth links, such as dial-up telephone lines, but the results are less than desirable as the presentation has to be made at low resolution or greatly compressed, both of which adversely affect the viewing experience.

While such low bandwidth channels might be acceptable for non-real-time downloading and free services, consumers are more likely to require higher quality presentations if they are to be paying for the presentations. Thus, as broadband connections become more available, more end users are able to receive streams of video presentations with sufficient quality that the end user is willing to pay for the streams. For example, if an end user connects to the Internet over a 56K dial-up line, the best the end user might expect for a video presentation is to watch the presentation with a low resolution or highly compressed, but an end user with a broadband connection might enjoy near full-screen video smoothly played. Examples of broadband connections include cable modems, optical fibers, wireless links, or digital subscriber line (DSL) channels, but other broadband connections in current use or later developed might be used instead.

Without users that are willing to pay for streaming services, some such services simply cannot be provided, as the costs of production are too great. As broadband has become more prevalent, more video streaming is economically possible. For example full length movies and live events, such as sports events or other media events, can be streamed and sufficient numbers of customers exist with broadband connections to make production of such streams economically viable. However, with the need to be paid to cover the production, new problems arise that are not present where the stream was being given away for free, for example, service providers need to ensure the streamed media provided to a user is paid for by the user.

Different payment models work in different situations and markets. Many cable broadcasters, for example, combine payment models, such as timed based subscriptions including the monthly subscription, the pay package, and the pay-per-view models. In the monthly subscription model, the user pays a monthly fee for unlimited access to a service for the paid months. In the pay package model, a user pays a one-time fee for unlimited access to a service for a fixed set of events, such as all the professional football game broadcasts for one football season. In the pay-per-view model, a user pays a one-time fee for access to the broadcasting of a single event. For example, a user may pay a one-time fee to view a live sporting event, such as Olympic sporting events that might not be broadcast on the public airwaves.

For television broadcasting of live and recorded events at times set by the broadcasters and the operators of the distribution channels, these models have been received by the consuming public with some success. Internet broadcasting, however, allows for on-demand viewing of events, with different viewers viewing the same or different streams at the same or different times and many paying customers have come to expect that offering. Thus, it is desirable to have a system wherein different viewers can consume different media streams and the providers of those streams can accurately track the consumption of the media streams, for billing, monitoring, planning, statistics tracking, and other purposes.

BRIEF SUMMARY OF THE INVENTION

An access control and metering system according to an embodiment of the present invention provides for communicating a metering uniform resource locator (URL) from a first server to a client browser over a network and communicating the streaming media file from a second server to the client browser over the network. The streaming media file includes at least one embedded metering event. In response to communicating the metering URL and the embedded metering to the client browser, a user meter is ticked.

According to another embodiment of the invention, computer code is provided for communicating a metering uniform resource locator (URL) from a first server to a client browser over a network; and computer code is provided for communicating the streaming media file from a second server to the client browser over the network. The streaming media file includes at least one embedded metering event. Computer code is also provided for ticking a user meter in response to communicating the metering URL and the embedded metering event to the client browser. In a specific embodiment, the metering URL is communicated over a first network link and the streaming media file is communicated over a second network link.

According to another embodiment of the invention, a system is provided that includes a client browser configured to tick a user meter and a first server configured to communicate a metering uniform resource locator (URL) from the first server to the client browser over a network. The system also includes a second server configured to communicate a streaming media file from the second server to the client browser over the network. The streaming media file includes at least one embedded metering event. The client browser is configured to tick the user meter in response to receiving the metering URL from the first server and the embedded metering event from the second server. According to a specific embodiment, the client browser includes a client media player configured to play the streaming media file, and the client media player playing the streaming media file encounters the embedded metering event and appends the embedded metering event to the metering URL.

According to another embodiment of the invention, a technique is provided for communicating a metering uniform resource locator (URL) from a streaming server to a client browser over a network connection and for communicating a streaming media file having at least one embedded metering event embedded in the streaming media file from the streaming server to the client browser over the network connection. In response to communicating the meter ticking event and the metering URL to the client browser a user meter is ticked.

The foregoing, together with other features, embodiments, and advantages of the present invention, will become more apparent when referring to the following detailed description, claims, and accompanying drawings.

DETAILED DESCRIPTION OF THE INVENTION

The streaming media system comprises several interrelated components that alone or in various combinations provide streaming media files for user consumption. The components of the streaming media system are best described by first describing the streaming media system and tracing the input of streaming media files into the system and then tracing a user request for the delivery of a streaming media file and describing the subsequent delivery and metering of the streaming media file.

Figure 1:
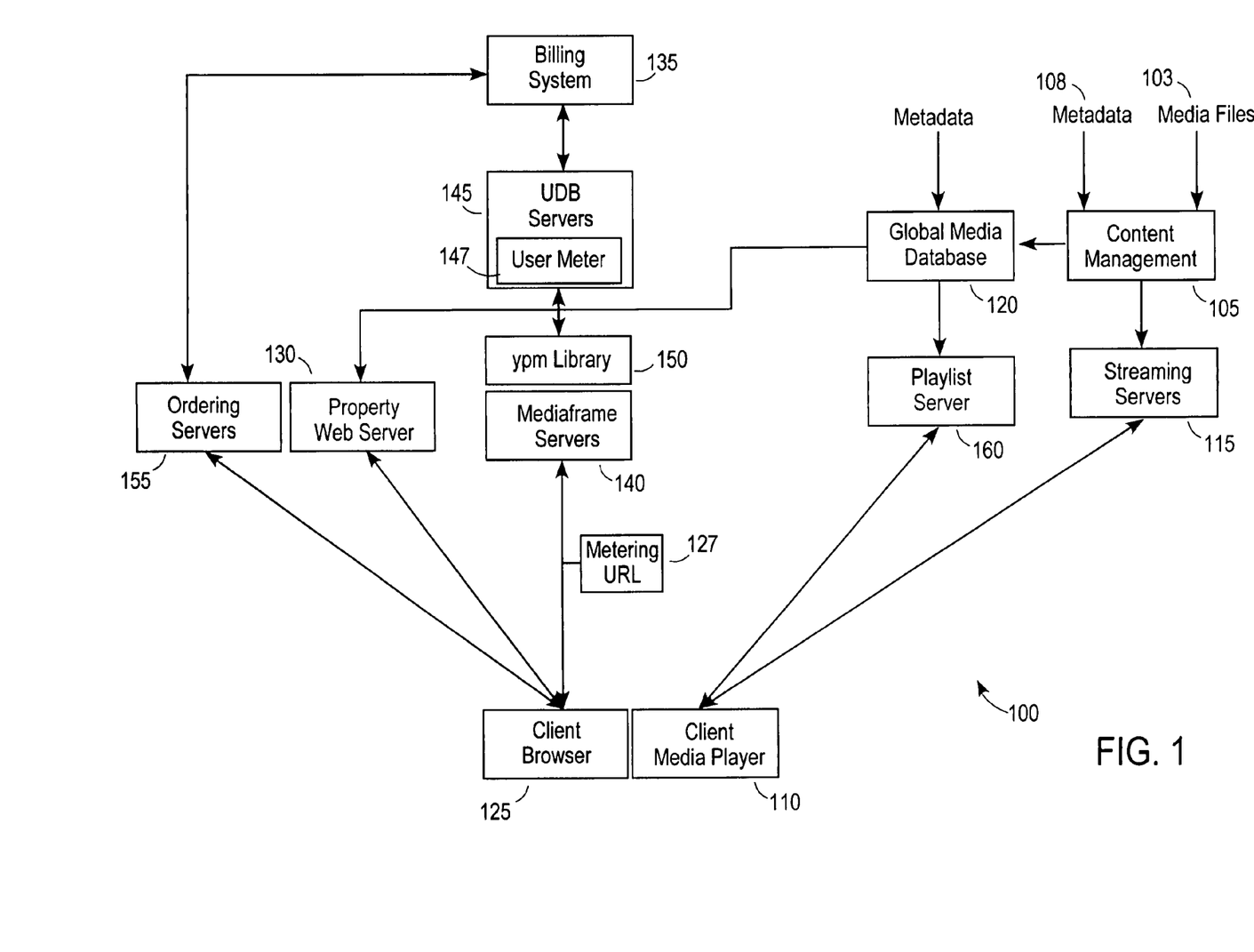
FIG. 1 is a simplified diagram of a streaming media system according to an embodiment of the present invention.

FIG. 1 is a simplified diagram of a streaming media system 100 according to an embodiment of the present invention. Various components of the streaming media system 100 will be described as they become relevant to the description. A typical scenario begins with a content provider delivering an analog media file or a digitized streaming media file (referred to herein as a "streaming media file") to a system administrator of the streaming media system 100 for entry onto a content management server 105. The system administrator enters, automatically, manually, or otherwise, appropriately formatted streaming media files 103 onto content management server 105 and digitizes analog files for entry onto content management server 105. Alternatively, a content provider may directly enter appropriately formatted streaming media files 103 onto content management server 105 via a network connection, such as an Internet connection. Streaming media files according to embodiments of the present invention might include video, audio, or a combination of video and audio that are digitized and stored on a server or the like. Streaming media files according to embodiments of the present invention include, but are not limited to, digitized movies, sports events, musical events, news clips, weather clips, and numerous others types of streaming media files.

Figure 2:
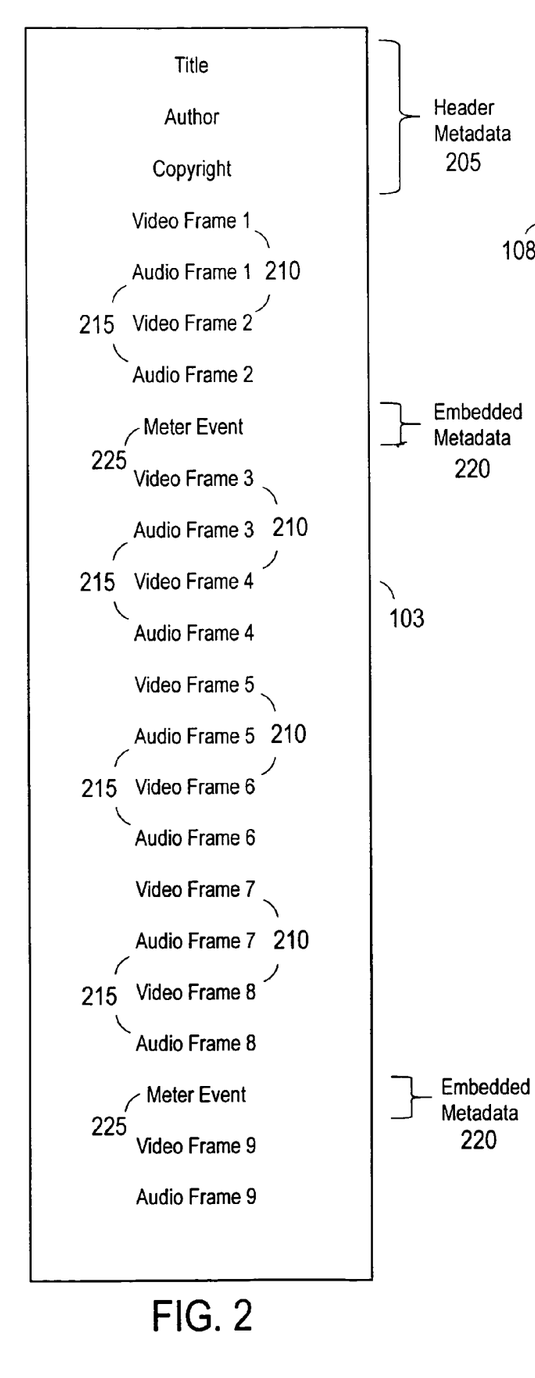
FIG. 2 is a simplified diagram of the format of a streaming media file according to one embodiment of the present invention.

FIG. 2 is a simplified diagram showing the format of a streaming media file 103 according to one embodiment of the present invention. Streaming media file 103 includes header metadata 205, video and audio frames 210 and 215, respectively, and embedded metadata 220. Header metadata 205 is disposed at the head end of streaming media file 103. The header metadata might include the title of the streaming media file (e.g., movie title), authorship information, copyright information, ownership information, searchable text fields, and information about various language tracks among other data. Those of skill in the art will recognize other useful information to include in header metadata 205.

Embedded metadata 220 differs from header metadata in that embedded metadata is dispersed in a streaming media file. The embedded metadata includes embedded metering events 225 used to tick a user meter as the streaming media file is played on a client media player 110. The ticking of the user meter by the embedded metering events might be used to tally charges to a user account.

Preferably, embedded metering events are embedded within or adjacent to the video or audio frames of a streaming media file. These events can then be passed to client media player 110 as the streaming media file is streamed. The embedded metering events are embedded at select time locations within a streaming media file. For example, in a movie file, an embedded metering event might be placed 5 seconds from the beginning of the movie with additional embedded metering events placed at 30 second intervals thereafter. Alternatively, the embedded metering events may be placed in a streaming media file at 10 second intervals, 60 second intervals, 2 minute intervals, or nearly any interval appropriate for the streaming media file being communicated (or "streamed"). The intervals at which embedded metering events are placed in a streaming media file need not be uniform. For example, a long movie may have embedded metering events embedded in a streaming media file with an increasing time interval between the metering events, such as at 5 seconds, 2 minutes, 10 minutes, and 30 minutes interval thereafter. Preferably, the position of metering events in a streaming media file provides indicators desired by content providers. For example, a movie provider might want to position an embedded metering event 5 seconds after video frame 1 has played so that the movie provider knows that the user has started a movie and, therefore, may log the event. Another embedded metering event may be positioned five minutes after the first mentioned embedded metering event so that the movie provider can determine whether the user is still watching the movie. For example, users who are simply previewing a movie and stop receiving the movie after the first few minutes of play time may not incur any charges. Other embedded metering events positioned every fifteen minutes for the duration of the movie and at the end of the movie may be of use to evidence receipt of the entire movie and may be of use against a user who later claims that the movie was never received.

Embedded metering events might be embedded into a streaming media file by the content provider or system administrator either during or after the digitization of the piece of media (e.g., audio, video, or audio-video medium). Further details of embedded metering events and their use for ticking a user meter will be described in greater detail below.

Figure 3:
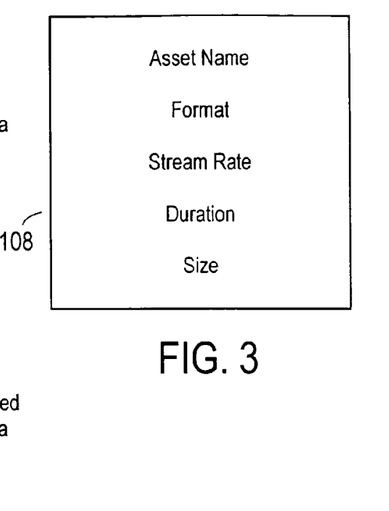
FIG. 3 is a simplified diagram of external metadata that may be independently placed on one or both of the global media database and the content management server according to an embodiment of the present invention.
Figure 4:
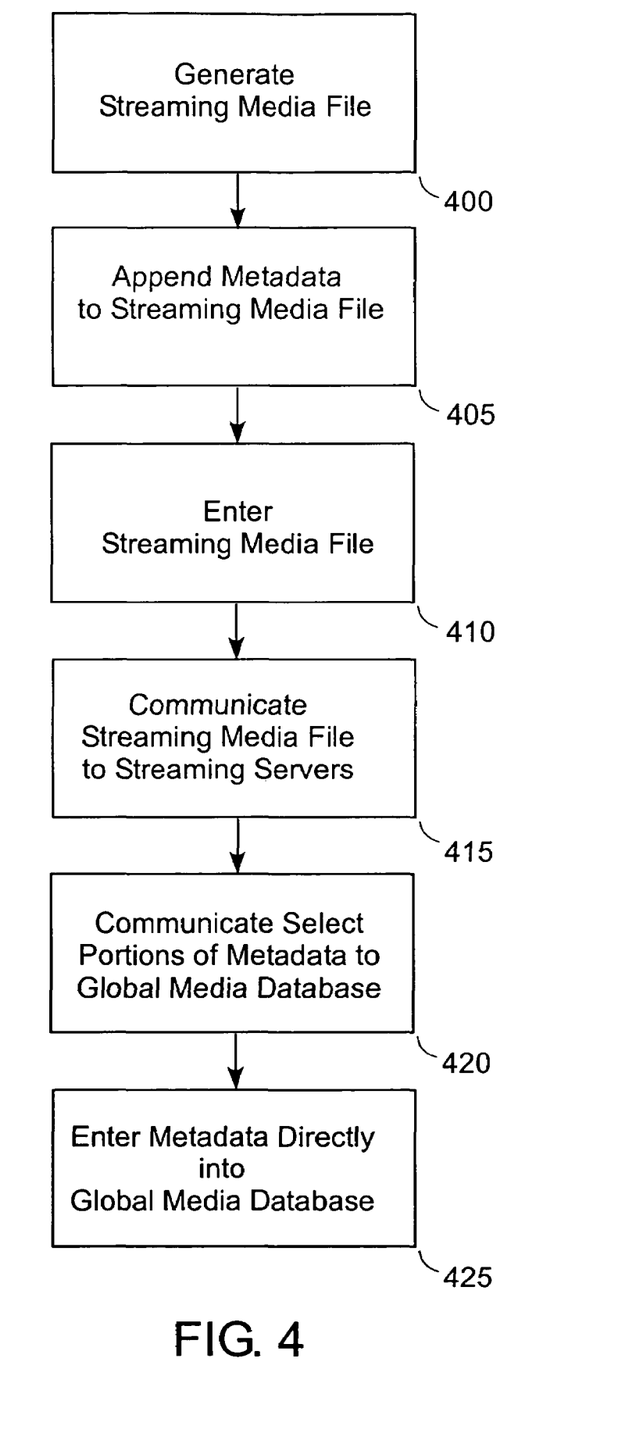
FIG. 4 is a high level flowchart having steps for entry of a streaming media file and associated metadata into a streaming media system according to an embodiment of the present invention.

FIG. 3 is a simplified diagram of external metadata 108 that may be independently placed on one or both of the global media database 120 and the content management server 105. The external metadata 108 may also be appended to streaming media file 103, such as at the head end of the streaming media file, and entered onto the content management server with the streaming media file or entered on the content management server independent of the streaming media file. External metadata 108 might include an asset name, format information, bit rate, duration, and file size. The asset name might include any arbitrary identifier used to identify the external metadata and its associated steaming media file. Format information might include, among other information, whether an associated steaming media file is in Windows Media Player™ format, RealOne Player™ format, RealPlayer™ format, QuickTime Player™ format or another player format. The stream rate includes the rate at which bits are streamed to client media player 110. Typical stream rates include, for example, 300 kbs (kilobits per second), 100 kbs, and 56 kbs among others. It should be understood that the listed media formats and associated stream rates are set forth for purposes of example; a piece of media may be stored in nearly any useful format that is amenable to network streaming.

A stream rate is often the rate at which the stream is transmitted, the rate at which it is consumed, or both, but actual transmission and consumption rates may vary from the stream rate. For example, where a transmission is stalled in a network, the transmission rate might fall below the stream rate. As another example, where a user slows a presentation or fastforwards, the consumption rate (i.e., the rate at which bits, bytes, blocks or symbols of the stream are "used up" in presenting) would be lower or higher than the stream rate. Of course, for a smooth presentation, the transmission rate, consumption rate and delay should be such that if the stream is ever consumed faster than it is received, there is enough delay between receipt and consumption that there is always some received portion of the stream to be consumed. This list of data included in external metadata 108 is not exhaustive; those of skill in the art will know of other useful metadata for the physical properties of a streaming media file as well as other features of a streaming media file.

Referring again to FIG. 1, subsequent to receiving a streaming media file, or during the receipt of a streaming media file, content management server 105 assigns a unique stream identifier to the streaming media file and thereafter transfers the streaming media file and associated stream identifier to a set of streaming servers 115. The term "set" as used herein includes sets that have one or more members. Each streaming server is configured to store a copy of the streaming media file and associated stream identifier. The streaming servers are further configured to stream a streaming media file along with its embedded metering events to client media player 110. Prior to a server streaming a streaming media file, however, various pieces of metadata are shared with a global media database 120 and various checks are performed to determine whether a user will be permitted to receive the streaming media file.

Metadata shared by content management server 105 with global media database 120 might include external metadata 108 (e.g., if its not already stored in database 120), the title, copyright information, searchable text fields, and information about various language tracks. According to a further embodiment, the time locations of the embedded metering events are also shared with the global media database. For example, the global media database may be informed that embedded metering events are located in a streaming media file, at 5 seconds from the beginning of the streaming media file and 35 second intervals thereafter. It should be understood the preceding time sequence is merely illustrative and that embedded metering events may be positioned in a streaming media file at nearly any useful location.

In addition to being configured to store external metadata 108, global media database 120 is also configured to store metadata that associates a given piece of media with the various media formats in which the given piece of media is stored. This allows the global media database to track the various media formats in which the movie is stored and associate the various media formats to a common identifier, such as a movie title or other useful identifier. The global media database might also be configured to store metadata that indicates whether a streaming media file is a for-pay file or a free file. For example, the metadata might indicate that a 56 kbs streaming media file for a given piece of media is a cost-free file whereas a streaming media file for a higher stream rate, such as a 300 kbs stream rate, is a for-pay file.

Users access streaming media files stored in streaming servers 115 by requesting and paying for for-pay streaming media files or by simply requesting cost-free streaming media files. According to a typical scenario, a user using a client browser 125 observes a web page published on the browser by a property web server 130, such as Yahoo! Movies™, Yahoo! Sports™, Yahoo! News™, Yahoo! Music or other property web server. The published page includes a link that points to a streaming media file. The link may be, for example, to a for-pay movie file or a free movie trailer file. The target of the link is a uniform resource locator (URL) generated by the global media database. By selecting (e.g., clicking) the link, the user causes the URL to be passed to the mediaframe servers thereby entering a request to receive the streaming media file. According to an alternative embodiment, by selecting the link, the user causes the URL to be passed to the property web servers thereby entering a request to receive the streaming media file.

According to one embodiment, the URL arguments include information for the products to which a streaming media file belongs. A product defines a set of streaming media files that belong to the product, and may include one or more streaming media files. Purchase of a product allows a user's client browser to receive the streaming media files belonging to the product. Examples of products include premium movie packages, premium sports packages, premium music event packages, or other packages. For example, a set of B-run movies may belong to a premium movie package while sets of A- and B-run movies may belong to an ultra-premium movie package. Streaming media files may belong to more than one product. In the example being considered, the B-run movies belong to both the premium and ultra-premium movie packages.

Products are typically sold in time blocks but may be sold based on volume of media consumed or other useful criteria. For example, a premium movie product may include 10 hours of streaming time for one fee while an ultra-premium movie product may include 20 hours of streaming time for a higher fee. Alternatively, the premium movie product may include 10 gigabits of streaming media for a given fee while the ultra-premium movie product may include 300 gigabits of streaming media for a higher fee. Other useful product options may include reduced-rate products for non peak use time or bulk purchase, such as the purchase of five or more products or the purchase of 200 or more product hours. Those of skill in the art will recognize other useful product options after reading this description.

Products are generated and stored in billing system 135, which defines the streaming media files belonging to a given product. The billing system also generates and stores prices for various products and generates information as to whether a streaming media file is a cost-free or for-pay file. The billing system is also configured to store legal contracts that are linked to the various products. The legal contracts might be presented to users, typically as click throughs, during product purchase.

In addition to including URL arguments regarding the various products a streaming media file belongs to, the URL passed from client browser 125 to mediaframe servers 140 (or alternatively property web server 130) is signed with a key, typically referred to as a server key. The key is a shared secret between the servers of streaming media system 100. According to one embodiment, the URL also contains a message authentication code (or MAC) generated by the global media database. Use of MACs ensures that a user cannot manipulate the arguments of the URL, for example, to alter a for-pay streaming media file to a cost-free streaming media file. URL arguments that are manipulated by the user and sent up to the property web server will cause a message to be sent to the client browser that the URL is invalid, thus stopping the transaction. MACs might be generated with a MD5 cryptographic function, a SHA1 cryptographic function or other useful cryptographic functions.

Subsequent to the URL being pushed onto mediaframe servers 140 (or alternatively property web server 130) by the client browser, the mediaframe servers search for a media cookie stored on client browser 125. Media cookies, according to an embodiment of the present invention, include information regarding a client browser's bandwidth capabilities. If the media cookie is not present on client browser 125, mediaframe servers 140 test the client browser's bandwidth capabilities. According to one embodiment, if the client browser's bandwidth capabilities are lower than a threshold, the user may be given access to a relatively low resolution version of the requested streaming media file cost free. Once the bandwidth of a client's browser is determined, the mediaframe servers set the media cookie on the client's browser.

Alternatively, if the client browser's bandwidth capabilities are equal to or higher than the threshold, the mediaframe servers query user database servers 145 and/or ypm (Yahoo! Payment) library 150 to ascertain whether the user has purchased a product that includes the requested streaming media file. In the alternative embodiment in which the property web servers 130 are the target of the link published on client browser 125, the property web servers query user database servers 145 and/or ypm library 150 to ascertain whether the user has purchased a product that includes the requested streaming media file. The user database servers and/or the ypm library store account information for users of streaming media system 100. The account information includes, among other information, products purchased, billing information, and the amount of streaming time remaining in a product. If user database servers 145 and/or ypm library 150 determine that a user has insufficient time remaining in a purchased product to consume the requested streaming media file or that the user has not purchased a product that includes the requested streaming media file, this information will be communicated to mediaframe servers 140 (or alternatively to property web servers 130). The mediaframe servers (or alternatively property web servers 130) contain business logic code that prompts the property web server to publish a page on the users browser with a link to an ordering server 155. If the user clicks the link to ordering server 155, the ordering server publishes an ordering page on the client browser with prompts for a user to purchase various products that include the requested streaming media file.

According to another embodiment, the mediaframe servers (or property web servers) command the ordering server to publish the ordering page eliminating the need for a user to click a link to the ordering page. Product information published on an ordering page is provided to the ordering server by billing system 135, which creates and stores available products. If a product is purchased, an account will be established for the user in user database server 145.

Once it is determined that the user has sufficient bandwidth to receive the requested streaming media file and has paid for a product containing the requested streaming media file, mediaframe servers 140 prepare a presentation for the user. The presentation includes the delivery of a media player to the user and the delivery of a URL that points the media player to the location of the streaming media file in streaming servers 115. In the delivery of the media player, the mediaframe servers publish a page on the user's browser with a frame set that includes a display screen for the media player and, if necessary, sets appropriate ActiveX controls on the web page.

According to an alternate embodiment, if the property servers determine the user has purchased a product containing the requested streaming media file and determine the product has sufficient time remaining to view the requested streaming media file, the property servers publish a web page on the client browser with a URL that points to the mediaframe servers. The mediaframe servers verify the authenticity of a MAC included in the URL, and if authentic, proceed to prepare and send the presentation to the user.

The URL included in the presentation includes a ticket for the requested streaming media file. The ticket in turn includes the stream identifier assigned to the streaming media file by content manager 105, and might include a user identifier, a time stamp, and maximum validity time. If the ticket is not redeemed by the client browser within the maximum validity time, the ticket is invalidated. This prevents a user from presenting a ticket twice for the same streaming media file. To further prevent the user from using a ticket twice, the user might not permitted to receive two streaming media files simultaneously.

Upon receipt of the URL, client media player 110 pushes the URL with the ticket onto playlist servers 160 that verify the ticket and performs a load balancing step. One load balancing approach streams media file from a variety of streaming servers 115 distributed across a variety of geographical locations. This redundancy of streaming servers, typically referred to as computer server clustering, provides that the streaming media file will not be interrupted should one of the streaming servers or network links fail. Redundancy of streaming servers 115 also allows users receiving streaming media files from streaming servers 115 to be served faster in the same amount of time. According to some embodiments, streaming servers 115 also run failover operations to help ensure streaming is not interrupted if one the streaming servers fails or is scheduled for down time.

In addition to having a ticket, the URL pushed from client media player 110 to playlist servers 160 contains a message authentication code (MAC) to ensure the authenticity of the URL. The use of the MAC provides that a clever user cannot fabricate their own URL to spoof the playlist servers and streaming servers into allowing the user to view streaming media files that the user has not paid for. The playlist servers are configured to verify the MAC's authenticity. If the URL is not authentic, the playlist servers publish a page on the user's browser indicating the URL is invalid. If the URL is authentic, playlist servers 160 push the URL with the ticket and MAC back to client media player 110, which in turn pushes the URL up to the streaming servers 115. The streaming servers authenticate the MAC and read the stream identifier to determine which streaming media file is to be streamed to the client media player. The streaming servers then stream the requested streaming media file to the client media player. (U.S. patent application Ser. No. 09/839,799, filed Apr. 19, 2001) titled MEDIA AND INFORMATION DISPLAY SYSTEMS AND METHODS and (U.S. patent application Ser. No. 09/801,439, filed Mar. 7, 2001) titled INFORMATION DISPLAY SYSTEM AND METHODS, describe a method and apparatus for implementing URLs having tickets and MACs to ensure URL authenticity, and are incorporated by reference herein for all purposes.

Included in the presentation sent from mediaframe servers 140 to client browser 125 is a metering URL 127 that points to a user meter located in the mediaframe server. The following is an example of a metering URL 127:

Metering URL 127 includes a variety of arguments that identify the host, the path to the meter, the meter name, and the meter description. A time stamp is also included in the metering URL. The time stamp may be used as a base reference time for measuring a time period in which the metering URL is valid. The metering URL also includes a key and MAC for authentication purposes. Subsequent to review of the present application, those of skill in the art will realize other useful URL arguments that may be included in the metering URL.

As a streaming media file is transmitted from the streaming servers, embedded metering events embedded in the streaming media file are also transmitted from streaming servers 115 and received by client media player 110. The embedded metering events, which are transparent to the streaming servers, evidence the passage of time as the streaming media file is received by client media player 110 and are used in combination with metering URLs to tick the user meter. The user meter is ticked in order for the user's account to be charged for consumption of the streamed media. The following is an example of an embedded metering event embedded in a streaming media file and transferred to the client media player:

METER(amt═══0.25&cs══fifam&ca══wxcxrq3XGvNSBIy8_3Zfhw--)
         decrement     key               MAC
          amount The embedded metering event includes the amount a user meter is to be decremented. The decrement amount may be any convenient time measure, such as seconds, fractions of a minute, fractions of an hour or other useful time measure. While the embedded metering event shown above includes the decrement amount of 0.25, any useful decrement amount may be used. The embedded metering event also includes a key and a MAC for validation purposes. Embedded metering events may include other useful arguments, which will be apparent to those of skill in the art subsequent to review of the present application.

Upon receipt of each embedded metering event in the streaming media file, client media player 110 appends the embedded metering events to metering URL 127 and returns the appended metering URLs to the mediaframe servers. In the example being considered the embedded metering event would be appended to the metering URL as follows:

http://tx.mediaframe.yahoo.com/meter?mcr=fifa&d=MWC82&t=1052853239&ss=fifam&sa=dfkj329pfskjk5f9er8931--&amt=0.25&cs=fifam&ca=wxcxrq3XGvNSBIy8_3Zfhw--

On receiving the metering URL and appended embedded metering event, mediaframe servers 140 authenticate the MAC passed in the metering URL. If the MAC is altered or missing, mediaframe servers 140 command streaming servers 115 to stop streaming the streaming media file. Absence or alteration of the key is an indication that the user has tampered with a metering URL. If the MAC is authentic, the mainframe servers proceed to tick the user meter and report the meter ticking event to user database servers 145 and/or the ypm library, which, in turn, appropriately decrements the user's account by the amount indicated in the embedded metering event. After receipt of the metering URL and appended embedded metering event, another metering URL is passed from media servers 140 to client media player 110 so that the next received embedded metering event may be appended to the newly received metering URL and pushed up to the mediaframe servers.

According to one embodiment of the invention, on sending a metering URL to client browser 125, mediaframe servers 140 expect the return of the metering URL with a first embedded metering event appended thereto within a predetermined length of time. For example, the mediaframe servers might expect the return of the metering URL for the first metering event within ten seconds (or some other useful time period), from the time the mediaframe servers initially send the metering URL to the client browser. If the metering URL for the first metering event in not received in the mediaframe servers within the predetermined time (e.g., 10 seconds), the mediaframe servers are configured to command streaming servers 115 to stop streaming the streaming media file to client media player 110. According to a further embodiment of the invention, each successive metering event is expected to be returned to the mediaframe servers within a predetermined time. For example, metering URLs appended with successive embedded metering events may be expected to be returned to the mediaframe servers within thirty five seconds (or some other useful time period), after receiving a preceding metering URL containing a preceding embedded metering event. If the successive metering URLs are not returned to the mediaframe servers in the predetermined times, the mediaframe servers command the streaming servers to stop streaming the streaming media file. The use of predetermined times in which appended metering URLs are to be returned to the mediaframe servers ensures that a user cannot simply block metering URLs from reaching the mediaframe servers and hence spoof the streaming media system into streaming media files that are not paid for.

The following discussion describes a method for streaming media files to a client browser according to embodiments of the present invention. The method is described in conjunction with the flowcharts in FIGS. 4-8 FIG. 4 is a flowchart of the steps for entry of a streaming media file and the associated metadata into a streaming media system according to an embodiment of the present invention. According to step 400, a piece of media is digitized to create a streaming media file. The streaming media file is embedded with metadata that includes embedded metering events. In step 405, the streaming media file is appended with metadata for ownership information, copyright information, searchable text fields, titles, information about various language tracks, and physical properties of the streaming media file, or other information. In step 410, the streaming media file along with its associated metadata is entered into a control management server, which assigns a unique identifier to the streaming media file. In step 415, the streaming media file, which includes the embedded metering events, is communicated to a set of streaming servers. In step 420, selected portions of the metadata entered into the content management server are communicated to the global media database, and in step 425 the metadata are directly loaded into the global media database. Metadata entered into and stored in the global media database include, among other things, associations between a given piece of media and the various streaming media file formats in which the given piece of media is stored.

Figure 5:
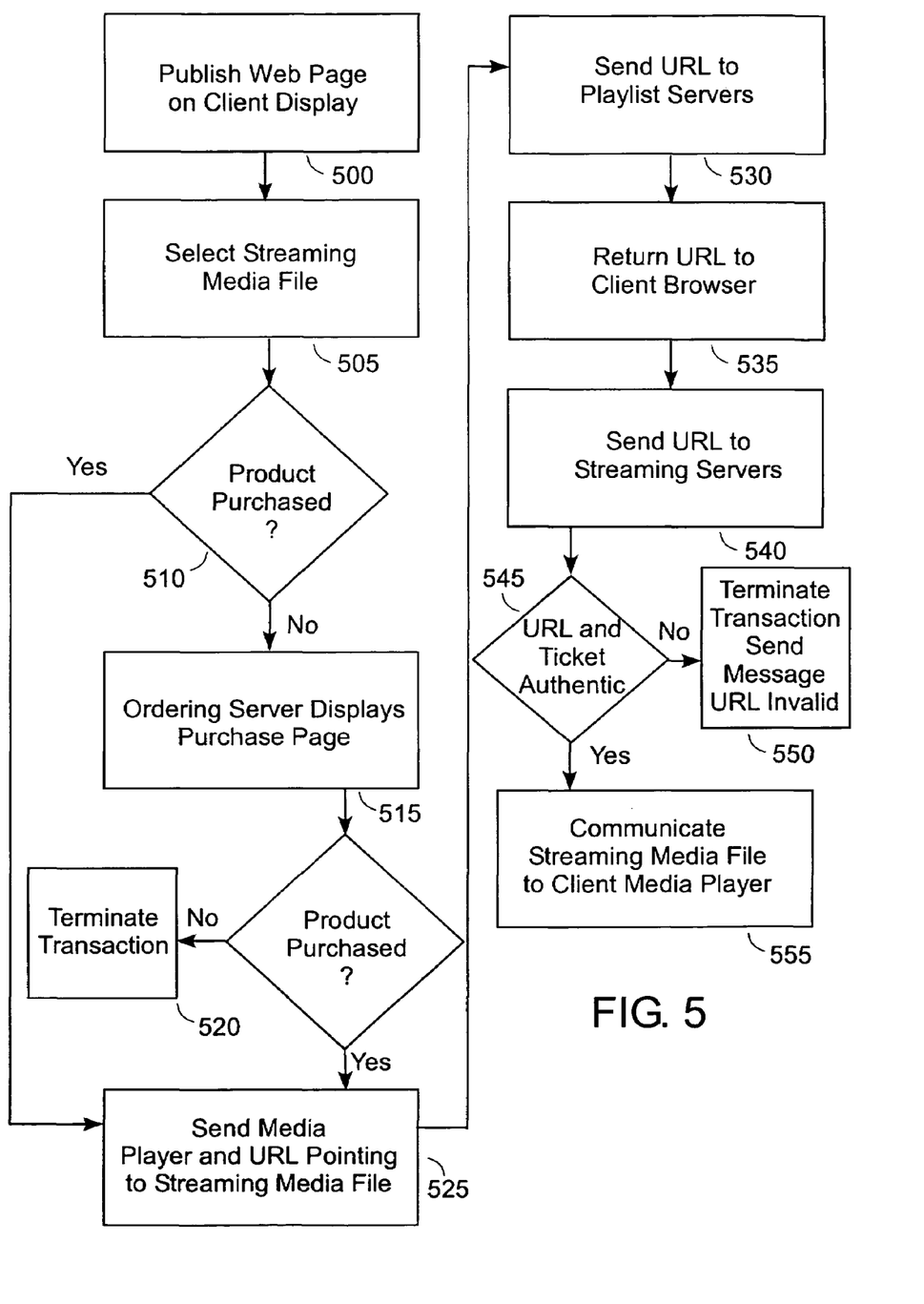
FIG. 5 is a high level flowchart having steps for a user request for communicating of a streaming media file from the streaming servers to the user's client browser according to an embodiment of the present invention.

FIG. 5A is a flowchart of the steps for a user request for communicating a streaming media file from the streaming servers to a user's client browser according to another embodiment of the present invention. In a step 500, a property web server publishes a page on the user's client browser. The published page includes a link to the streaming media file. In step 505, the user selects the link to request communication of the streaming media file. The target of the link is a URL, which is sent to the mediaframe servers. According to alternate embodiment at step 505, the target of the link is a URL, which is sent to the property web servers. The URL includes a message authentication code to ensure the authenticity of the URL and includes arguments that identify the requested streaming media file. The URL also includes the products to which the streaming media file belongs. In step 510, the mediaframe servers cause a user database server to be queried to determine whether the user has purchased a product that includes the requested streaming media file. According to an alternate embodiment, at step 510, the product web servers cause the user database server to be queried to determine whether the user has purchased a product that includes the requested streaming media file. If the user has not purchased a product including the streaming media file, a page is published on the client browser with a link to an ordering server, step 515. If the user does not purchase a product that includes the streaming media file, the transaction is terminated, step 520. If the user purchases or has previously purchased a product that includes the streaming media file, the mediaframe servers send a media player to the client browser and send a URL pointing the media player to the streaming media file, step 525. The URL includes a message authentication code, such as those discussed above, and includes a ticket that has a unique identifier for the streaming media file. The URL is sent to playlist servers 160 that authenticate the URL and performs a load balancing step for a set of streaming servers, step 530. The URL is returned to the client browser, step 535. The client browser in turn sends the URL to the streaming servers, step 540. The streaming servers verify the authenticity of and ticket, step 545. If either the ticket is not authentic a message is returned to the client browser indicating the URL is invalid, step 550. Alternatively, if the ticket is valid, a streaming media file having embedded metering events is communicated to the client media player, step 555.

Figure 6:
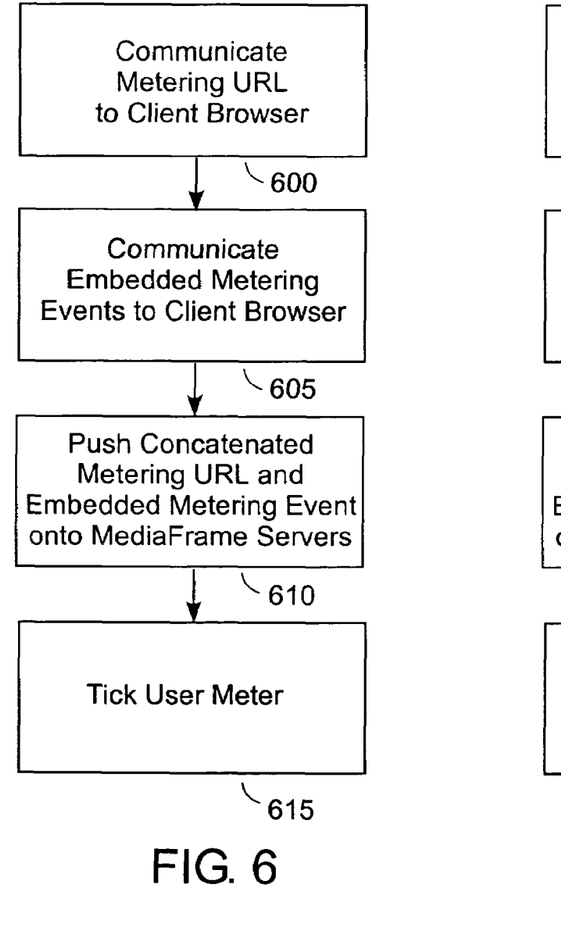
FIG. 6 is a high level flowchart having steps for communicating a metering URL and embedded metering events to a client media player according to an embodiment of the present invention.

FIG. 6 is a flowchart of the steps for communicating a metering URL and embedded metering events to a client media player according to an embodiment of the present invention. In step 600, a metering URL is communicated from the mediaframe servers to the client browser over a first network link. A streaming media file that includes at least one embedded metering event is communicated from at least one streaming server to the client browser over a second network link, step 605. The client media player concatenates the metering URL and the embedded metering event, step 610, and pushes them up to the mediaframe servers, which causes a user meter to be ticked, step 615.

Figure 7:
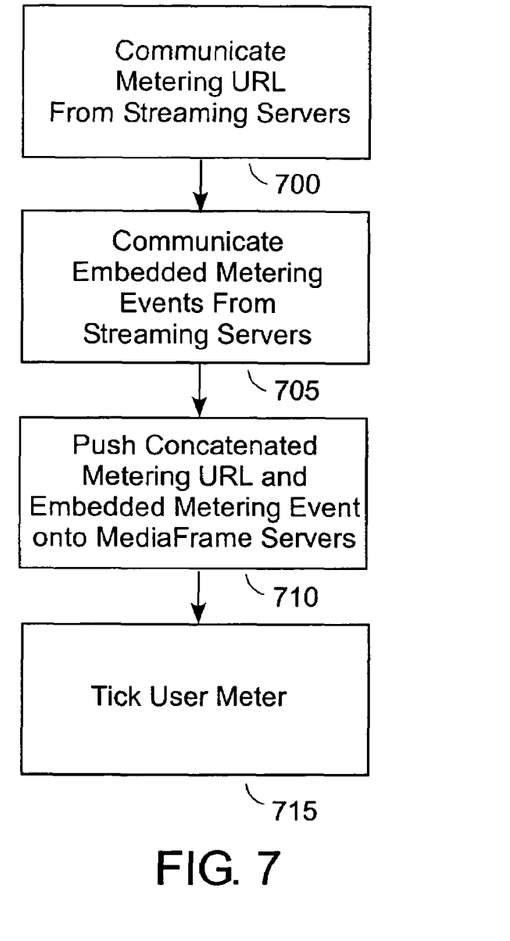
FIG. 7 is a high level flowchart having steps for communicating a metering URL and embedded metering events to a client media player according to another embodiment of the present invention.

FIG. 7 is a flowchart of the steps for communicating a metering URL and embedded metering events to a client media player according to another embodiment of the present invention. In step 700, a metering URL is communicated from at least one streaming server to the client browser. A streaming media file that includes at least one embedded metering event is communicated from the streaming server to the client browser, step 705. The client media player concatenates the metering URL and the embedded metering event, step 710, and pushes them up to the mediaframe servers, which causes a user meter to be ticked/decremented, step 715.

Figure 8:
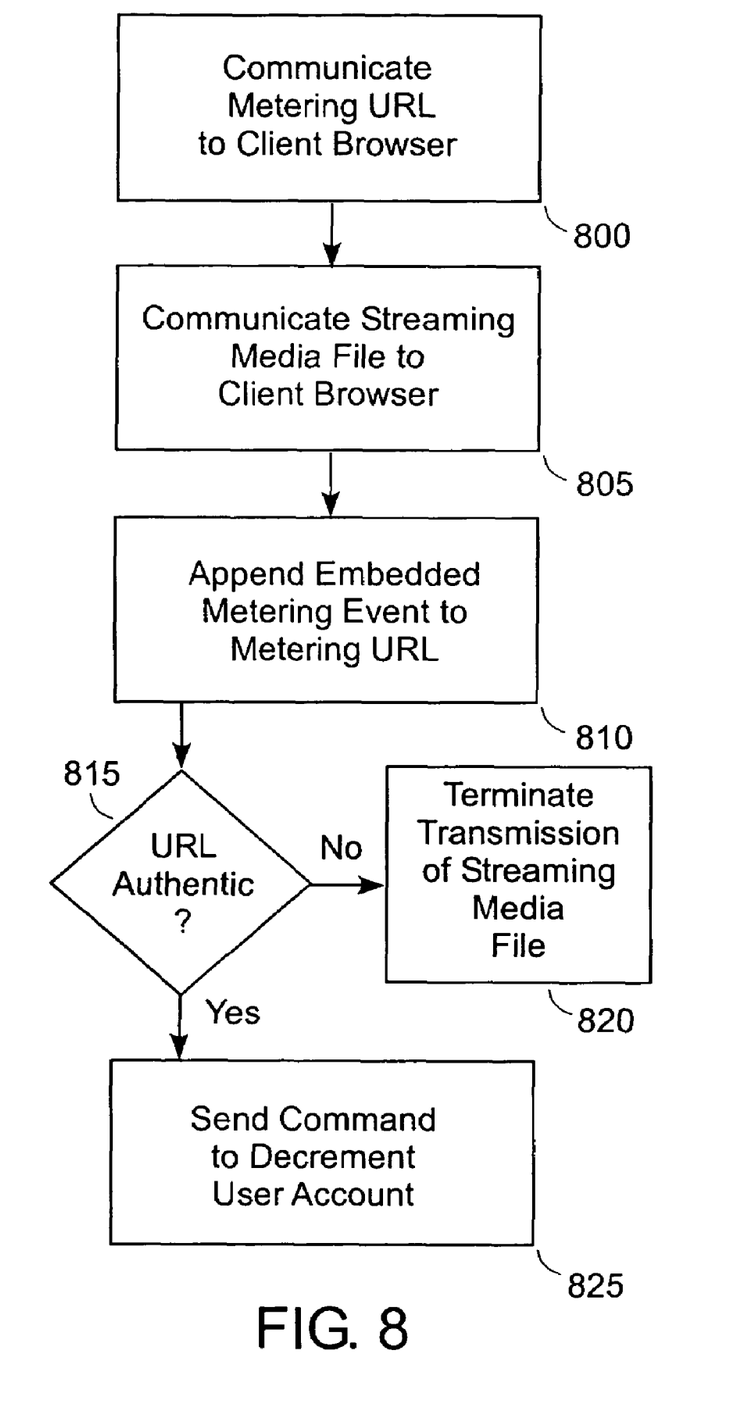
FIG. 8 is a high level flowchart having steps for communicating a metering URL and embedded metering events to a client media player according to another embodiment of the present invention.

FIG. 8 is a flowchart of the steps for communicating a metering URL and embedded metering events to a client media player according to another embodiment of the present invention. In step 800, a metering URL is communicated from the mediaframe servers to the client browser over a network connection. The metering URL is keyed with a digital signature algorithm. A streaming media file that includes at least one embedded metering event is communicated from a set of streaming servers to the client browser over a network connection, step 805. The metering URL appended with the embedded metering event is sent to the mediaframe server, step 810. The mediaframe servers check the authenticity of the metering URL, step 815. If the URL is not authentic or is absent, the metering server commands the streaming servers to stop streaming the streaming media file to the client browser, step 820. If the URL is authentic, the embedded metering event appended to the metering URL is used to tick a user meter stored in the mediaframe server, step 820. According to one embodiment, the user meter is stored in a user database server. After the user meter is ticked, the mediaframe servers send a command to the user database to decrement a user account by the amount of time indicated in the embedded metering event, step 825.

While specific embodiments of the invention have been described, various modifications, alterations, alternative constructions, and equivalents are also encompassed within the scope of the invention. The described invention is not restricted to operation within certain specific networking environments, but can operate within a variety of networking environments. Additionally, while embodiments of the present invention have been described using particular series of transactions and steps, it should be apparent to those skilled in the art that the scope of the present invention is not limited to those described series of transactions and steps.

Further, while the present invention has been described using a particular combination of hardware and software, it should be recognized that other combinations of hardware and software are also within the scope of the present invention. The present invention may also be implemented only in hardware, or only in software, or using combinations thereof.

The specification and drawings are, accordingly, to be regarded as illustrative rather than restrictive. It will be evident that additions, subtractions, deletions, and other modifications and changes may be made without departing from the broader spirit and scope of the invention as set forth in the following claims.

What is claimed is:

1. A method for streaming a streaming media file from a server to a client player for consumption of the steaming media file at the client player, the method comprising:
   transmitting a metering uniform resource locator (URL) from a first server to a client player over a network, wherein the metering URL includes a timestamp as a base reference time for measuring a time period in which the metering URL is valid;
   identifying, using the metering URL, a path to a user meter that meters receipt of metadata embedded in the streaming media file at select time locations;
   streaming the streaming media file from a second server to the client player over the network;
   receiving an embedded metering event comprising a decrement amount in the streaming media file at the client player, wherein the embedded metering event is a portion of the metadata;
   appending the metering event to the metering URL by the client player to create a new metering URL;
   transmitting the new metering URL to the remote first server
   receiving the decrement amount from the new metering URL; and
   ticking the user meter in the first server, wherein ticking comprises decrementing the user meter by the decrement amount.

2. The method of claim 1 wherein the metering URL is communicated over a first network link and the streaming media file is communicated over a second network link.

3. The method of claim 1 further comprising transmitting a second metering URL from the first server to the client player over the network, if the decrement amount is received at the user meter within the time period in which the metering URL is valid, wherein the second metering URL identifies the path to the user meter, and wherein the second metering URL includes a second timestamp as a second base reference time for measuring a second time period in which the second metering URL is valid.

4. The method of claim 2 further comprising communicating a client media player from the first server to the client player.

5. The method of claim 1 further comprising:
decrementing a user account based on the decrement amount.

6. The method of claim 5 further comprising stopping the streaming step if the new metering URL is not communicated from the client player to the first server within a predetermined time.

7. The method of claim 5 further comprising signing the metering URL with a message authentication code (MAC).

8. The method of claim 7 further comprising:
verifying the authenticity of the URL in the first server; and
stopping the streaming step if the URL is not verified.

9. The method of claim 7 wherein the MAC is an MD5 hash or a SHA1 hash.

10. A computer-readable storage medium storing computer readable instructions that cause a computing system to perform a plurality of operations, including:
transmitting a metering uniform resource locator (URL) from a first server to a client player over a network, wherein the metering URL includes a timestamp as a base reference time for measuring a time period in which the metering URL is valid;
identifying, using the metering URL, a path to a user meter that meters receipt of metadata embedded in the streaming media file at select time locations;
streaming the streaming media file from a second server to the client player over the network;
receiving an embedded metering event comprising a decrement amount in the streaming media file at the client player, wherein the embedded metering event is a portion of the metadata;
appending the metering event to the metering URL by the client player to create a new metering URL;
transmitting the new metering URL to the remote first server
receiving the decrement amount from the new metering URL; and
ticking the user meter in the first server, wherein ticking comprises decrementing the user meter by the decrement amount.

11. The computer-readable storage medium of claim 10 wherein the metering URL is communicated over a first network link and the streaming media file is communicated over a second network link.

12. The computer program product computer-readable storage medium of claim 10 wherein the instructions further cause the computing system to perform the operation of transmitting a second metering URL from the first server to the client player over the network, if the decrement amount is received at the user meter within the time period in which the metering URL is valid, wherein the second metering URL identifies the path to the user meter, and wherein the second metering URL includes a second timestamp as a second base reference time for measuring a second time period in which the second metering URL is valid.

13. The computer-readable storage medium of claim 11 further comprising instructions for communicating a client media player from the first server to the client player.

14. The computer-readable storage medium of claim 10 further comprising instructions for:
decrementing a user account based on the decrement amount.

15. The computer-readable storage medium of claim 14 further comprising instructions for stopping the computing system from performing the operation of streaming if the new metering URL is not communicated from the client player to the first server within a predetermined time.

16. The computer program product of claim 14 further comprising signing the metering URL with a message authentication code (MAC).

17. The computer program product of claim 16 further comprising:
code for verifying the authenticity of the URL in the first server; and
code for stopping the code for streaming from executing if the URL is not verified.

18. The computer program product of claim 16 wherein the MAC is an MD5 hash or a SHA1 hash.

19. A method for streaming a streaming media file to a client player, the method comprising:
transmitting a metering uniform resource locator (URL) from a first server to a client player over a network, wherein the metering URL includes a timestamp as a base reference time for measuring a time period in which the metering URL is valid;
identifying, using the metering URL, a path to a user meter configured to meter receipt of metadata embedded in the streaming media file at select time locations,
streaming the streaming media file from the first server to the client player over the network;
receiving an embedded metering event comprising a decrement amount embedded in the streaming media file at the client player wherein the embedded metering event is a portion of the metadata;
appending the metering event to the metering URL by the client player to create a new metering URL;
transmitting the new metering URL to a remote second server
receiving the decrement amount from the new metering URL; and
ticking the user meter in the second server, wherein ticking comprises decrementing the user meter by the decrement amount.

20. A streaming media system for streaming a streaming media file from a server to a client browser for consumption of the steaming media file at the client browser, the system comprising:
a client browser configured to tick a user meter that meters receipt of metadata embedded in the streaming media file at select time locations;
a first server configured to communicate a metering uniform resource locator (URL) from the first server to the client browser over a network, wherein the metering URL includes an argument that identifies a path to a user meter at a network location other than the client browser, and wherein the metering URL includes a timestamp as a base reference time for measuring a time period in which the metering URL is valid; and
a second server configured to communicate the streaming media file from the second server to the client browser over the network; wherein the streaming media file includes at least one embedded metering event at a selected time location within the streaming media file, wherein the at least one embedded metering event is a portion of the metadata, and wherein the at least one embedded metering event includes a decrement amount indicating an amount of time that the user meter is to be decremented when ticked, and wherein the client browser is configured to tick the user meter in response to receiving the metering URL from the first server and the at least one embedded metering event from the second server, and wherein the client browser appends the metering event to the metering URL to create a new metering URL that is transmitted to the remote user meter, which receives the decrement amount from the new metering URL and is ticked by being decremented by the decrement amount.

21. The system of claim 20 further comprising a third server configured to generate the user meter.

22. The system of claim 20 wherein the client browser includes a client media player configured to play the streaming media file; and wherein the client media player playing the streaming media file encounters the embedded metering event and appends the embedded metering event to the metering URL.

23. The system of claim 22 wherein:
the client browser is configured to append the embedded metering event to the metering URL to form the new metering URL and communicate the new metering URL to the first server; and
the first server is configured to decrement a user account.

24. The system of claim 20 wherein the metering URL is signed with a message authentication code (MAC).

25. The system of claim 24 wherein the MAC is an MD5 hash, a SHA1 hash, or a ghost key.

26. A streaming media system wherein a media presentation is streamed to a client system while tracking usage of the media presentation by the client system, the system comprising:
a mediaframe server that transmits a metering uniform resource locator (URL) to a client player over a network, wherein the metering URL includes an argument that identifies a path to a usage meter that meters receipt of metadata embedded in the streamed media presentation, and wherein the metering URL includes a timestamp as a base reference time for measuring a time period in which the metering URL is valid;
a client player that is programmed to present to a user the streamed media presentation;
a streaming server programmed to transfer the streamed media presentation to the client player, including embedded metering events represented by the metadata in the streamed media presentation, wherein the embedded metering events are dispersed at select time locations in the streamed media presentation, and wherein the embedded metering events include decrement amounts indicating amounts of time that the usage meter is to be decremented when ticked;
an extractor, at the client system, programmed to extract the embedded metering events from the streamed media presentation, append each metering event to the metering URL to create a new metering URL, and send the new metering URL to the remote usage meter;
the usage meter programmed to adjust a user account based on each decrement amount in the received-metering event; and
a controller programmed to discontinue the media presentation if the time period lapses such that the metering URL is no longer valid.

27. A method for streaming a streaming media file for consumption of the steaming media file by a client player, the method comprising:
transmitting a metering uniform resource locator (URL) to the client player over a network, wherein a target specified in the metering URL is a user meter at a network location other than the client player and wherein the user meter meters consumption of the streaming media file by the client player;
embedding a metering indicator in the streaming media file to create an embedded streaming media file, wherein the metering indicator includes a decrement amount indicating an amount of time that the user meter is to be decremented when ticked;
streaming the embedded streaming media file to the client player over the network;
receiving at the user meter the embedded metering indicator appended to the metering URL by the remote client player; and
ticking the user meter server based on receipt of the embedded metering indicator, wherein ticking comprises decrementing the user meter by the decrement amount.

28. The method of claim 27, further comprising:
verifying an authenticity of the metering URL that is received at the user meter, based on at least one message authentication code (MAC) applied to at least one of the following; the metering URL and the embedded metering indicator appended to the metering URL; and
stopping the streaming step if the metering URL is not verified.

* * * * *

UNITED STATES PATENT AND TRADEMARK OFFICE
CERTIFICATE OF CORRECTION

PATENT NO. : 7,383,229 B2  Page 1 of 1
APPLICATION NO. : 10/680507
DATED : June 3, 2008
INVENTOR(S) : Jacoby It is certified that error appears in the above-identified patent and that said Letters Patent is hereby corrected as shown below:

In column 9, line 10, delete "users" and insert -- user's --, therefor.

In column 15, line 50, in Claim 12, after "The" delete "computer program product".

Signed and Sealed this

Nineteenth Day of August, 2008

JON W. DUDAS
*Director of the United States Patent and Trademark Office*